United States Patent [19]

Morishita et al.

[11] Patent Number: 5,974,872
[45] Date of Patent: Nov. 2, 1999

[54] PITCH ARRANGEMENT EVALUATION SYSTEM OF TREAD PATTERN OF PNEUMATIC TIRE

[75] Inventors: Hisaya Morishita; Teruhiko Kikuchi; Toshihiko Suzuki, all of Hiratsuka, Japan

[73] Assignee: The Yokohama Rubber Co., Ltd., Tokyo, Japan

[21] Appl. No.: 08/849,245

[22] PCT Filed: Oct. 16, 1996

[86] PCT No.: PCT/JP96/02992

§ 371 Date: Jun. 12, 1997

§ 102(e) Date: Jun. 12, 1997

[87] PCT Pub. No.: WO97/14946

PCT Pub. Date: Apr. 24, 1997

[30] Foreign Application Priority Data

Oct. 17, 1995 [JP] Japan ................................ 7-268877

[51] Int. Cl.[6] .......................... G01M 17/02; B60C 11/03
[52] U.S. Cl. ............................... 73/146; 152/209.2
[58] Field of Search .................... 73/8, 146, 146.2, 73/146.3, 146.4, 146.5; 152/209.2, 209.3, 209.8, 209.9, 209.14, 209.18

[56] References Cited

U.S. PATENT DOCUMENTS

| | | | |
|---|---|---|---|
| 3,989,780 | 11/1976 | Vorih ........................................ | 73/146 |
| 4,178,199 | 12/1979 | Lippman et al. ........................ | 73/146 |
| 4,416,316 | 11/1983 | Clatworthy et al. .................. | 152/209.2 |
| 4,442,499 | 4/1984 | Sekula .................................... | 152/209.2 |
| 4,777,993 | 10/1988 | Yamashita et al. .................. | 152/209.2 |
| 4,798,236 | 1/1989 | Fujiwara ............................... | 152/209.2 |
| 5,125,544 | 6/1992 | Yoshida ................................ | 152/209.2 |
| 5,269,357 | 12/1993 | Killian .................................. | 152/209.2 |
| 5,295,087 | 3/1994 | Yoshida et al. ........................... | 73/146 |
| 5,314,551 | 5/1994 | Williams ............................... | 152/209.2 |
| 5,383,506 | 1/1995 | Kogure ................................. | 152/209.2 |
| 5,658,409 | 8/1997 | Kakumu .............................. | 152/209.2 |

FOREIGN PATENT DOCUMENTS

| | | |
|---|---|---|
| 57-49998 | 3/1982 | Japan . |
| 1-250831 | 10/1989 | Japan . |
| 4-148840 | 5/1992 | Japan . |

*Primary Examiner*—George Dombroske
*Attorney, Agent, or Firm*—Nikaido, Marmelstein, Murray & Oram LLP

[57] ABSTRACT

A pneumatic tire has a tread pattern shaped in such a fashion that pitches determined by groove portions disposed on a tread surface in a predetermined pitch in at least a tire circumferential direction have at least three different kinds of pitch lengths. An amplitude waveform corresponding to the frequency of noise resulting from the pitch arrangement per circumference of the tire is determined by a noise simulation method, and whether or not the pitch arrangement determined by the noise simulation is a pitch arrangement of a low pattern noise is evaluated from the value of a correlational coefficient R between the amplitude waveform and a quartic expression obtained by the regression of the amplitude waveform.

6 Claims, 4 Drawing Sheets

$f(x) = 1 \times 10^{-4} x^4 + 0.0001 x^3 - 0.0533 x^2 - 0.0293 x + 6.3938$ $R = 0.36$ $f(x) = -8 \times 10^{-5} x^4 + 0.0003 x^3 + 0.0228 x^2 - 0.0715 x + 1.9441$ $R = 0.92$ $f(x) = -8 \times 10^{-5} x^4 + 0.0003 x^3 + 0.023 x^2 - 0.0713 x + 1.9368$ $R = 0.66$ $f(x) = -8 \times 10^{-5} x^4 + 0.0003 x^3 + 0.0231 x^2 - 0.074 x + 1.9297$ $R = 0.84$ $f(x) = 7 \times 10^{-5} x^4 - 4 \times 10^{-5} x^3 - 0.0388 x^2 + 0.0106 x + 4.9721$ $R = 0.58$ $f(x) = -8 \times 10^{-5} x^4 + 0.0003 x^3 + 0.0228 x^2 - 0.0726 x + 1.943$ $R = 0.40$ $$f(x) = -9 \times 10^{-8} x^4 + 6 \times 10^{-6} x^3 - 3 \times 10^{-5} x^2 - 0.0125x + 1.1015$$

$$R = 0.80$$

PITCH ARRANGEMENT EVALUATION SYSTEM OF TREAD PATTERN OF PNEUMATIC TIRE

TECHNICAL FIELD

This invention relates to a method of simulating and evaluating a pattern noise of a pitch arrangement of a tread pattern formed on the tread surface of a pneumatic tire. More particularly, this invention relates to an evaluation method of a tread pattern pitch arrangement of a pneumatic tire which makes it possible to bring an evaluation result of a low pattern noise by a noise simulation method into conformity with a feeling evaluation result by an actual car test.

BACKGROUND ART

It is generally known that the pattern noise resulting from the tread pattern formed on the tread surface of a pneumatic tire can be reduced by somehow devising the pitch arrangement of the tread pattern. It is known also that the pattern noise can be reduced particularly by achieving a certain specific cycle arrangement or a random arrangement by employing three or more kinds of pitches (pitch lengths).

Recently, simulation has been carried out to evaluate in advance whether or not the pattern noise can be reduced, when a tread pattern having a new pitch arrangement is designed.

A pitch variation method is one of the well known noise simulation methods for evaluating the noise by simulation.

This pitch variation method comprises the steps of determining an amplitude waveform of the noise resulting from the tread pattern of one circumference of the tire from each data of a pitch arrangement, transforming the amplitude waveform to a Fourier series not having limitation to the pitch arrangement method, avoiding those spectrum waveforms in which the amplitude of a specific frequency exhibits an excessive peak among the spectrum waveforms, regarding the spectrum waveforms which are dispersed into a large number of sideband waves having lower levels, as superior, and evaluating them as a pitch arrangement having a low pattern noise.

However, when the pneumatic tires which are evaluated as having a low noise pattern by the evaluation method described above are fitted actually to a car and a feeling test of the pattern noise is carried out by a driver, the evaluation often results in that the tires do not have a low pattern noise.

Though various other evaluation methods have been studied so far, a pitch arrangement evaluation method whose simulation result always coincides with the actual car test has not yet been developed, and a satisfactory simulation evaluation method has been desired earnestly.

It is therefore an object of the present invention to provide an evaluation method of a tread pattern pitch arrangement of a pneumatic tire which can always bring the simulation evaluation result of a low pattern noise resulting from the pitch arrangement into conformity with the actual measurement result.

DISCLOSURE OF THE INVENTION

To accomplish the object described above, the present invention provides an evaluation method of a pitch arrangement of a tread pattern of a pneumatic tire having a tread pattern divided by a large number of grooves disposed on the tread surface at a predetermined pitch in at least a tire circumferential direction and having at least three different kinds of pitch lengths, characterized in that an amplitude waveform corresponding to the frequency of noise resulting from the pitch arrangement of one circumference of the tire is determined by a noise simulation method, a correlation coefficient R expressed by the formula below, between the amplitude waveform and a quartic expression $f(x)=ax^4+bx^3+cx^2+dx+e$ (where $f(x)$ is a noise amplitude and x is the frequency) obtained by the regression of the amplitude waveform is determined, and whether or not the pitch arrangement obtained by the noise simulation method is a pitch arrangement of a low pattern noise is evaluated from the value of the correlational coefficient R:

$$R = \sqrt{1 - \frac{S}{T}}$$

where $S = \sum (Y_i - \hat{Y}_i)^2$, $T = (\sum Y_i)^2 - \frac{(\sum Y_i)^2}{n}$ $\hat{Y}_i = ax_i^4 + bx_i^3 + ...$ $Y_i$ is an actual noise amplitude for a frequency $x_i$ $n$ is the number of data.

The inventors of the present invention have studied in detail the tread patterns and the pattern noises of pneumatic tires having various pitch arrangements through various trials and errors, and have discovered that the correlation between the amplitude waveform of each frequency of the noise resulting from the tread pattern of a pneumatic tire having the tread pattern with at least three kinds of different pitch lengths and quartic function obtained by regression of the amplitude waveform is extremely important in order to bring the evaluation result of the pattern noise by a noise simulation method into conformity with the evaluation result of a feeling evaluation when one listens to the pattern noise.

It has been found out also that when the correlational coefficient R is at least 0.65, and when this value is closer to 1, the simulation evaluation result can be brought into conformity with the feeling and measurement evaluation of the actual car test, and the pattern noise can be reduced.

According to the evaluation method of the pitch arrangement of the tread pattern of the present invention, therefore, a pneumatic tire having a pitch arrangement of a low noise pattern can be reliably obtained by only the evaluation by the noise simulation method without conducting the evaluation by the actual car test.

BEST MODE FOR CARRYING OUT THE INVENTION

Figure 1:
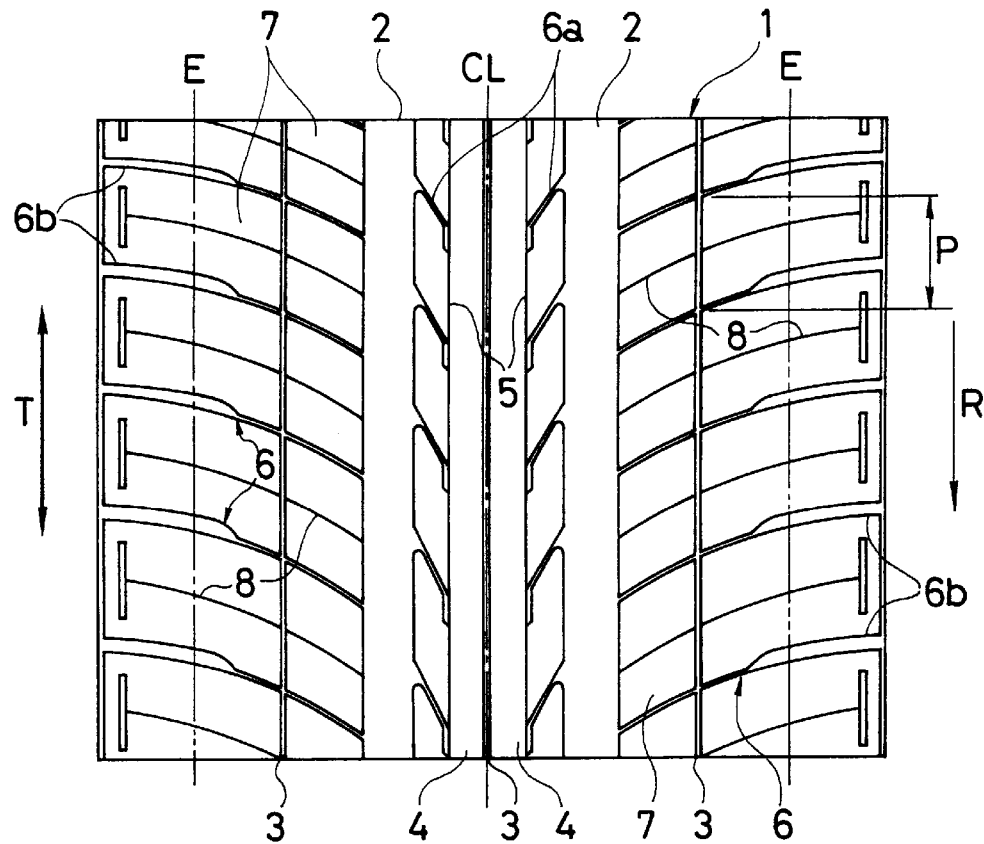
FIG. 1 is an exploded view of principal portions and shows an example of the tread surface of a pneumatic tire for which an evaluation method of this invention is used.
Figure 2:
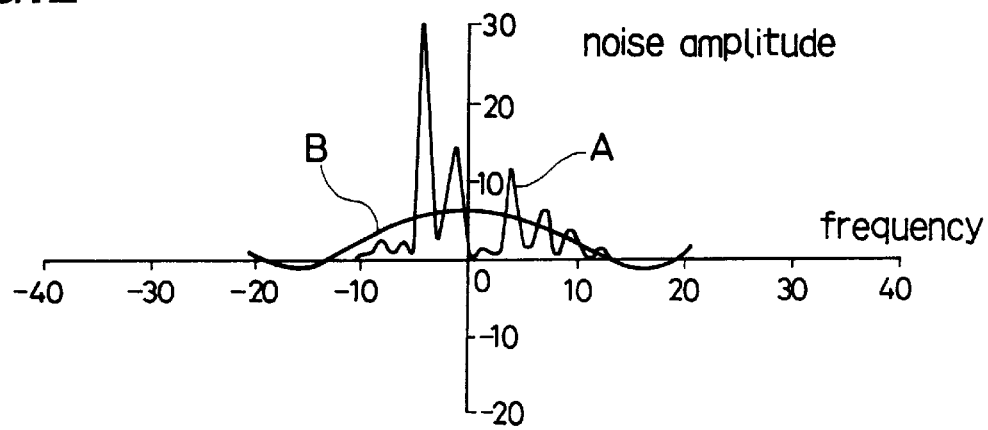
FIG. 2 is a graph showing a noise amplitude waveform obtained by noise simulation in a test tire 1 and its recurrent quartic curve.
Figure 3:
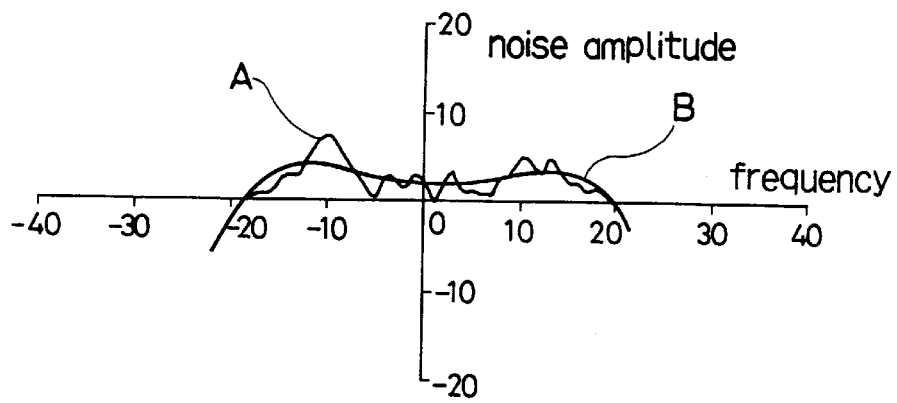
FIG. 3 is a graph showing a noise amplitude waveform in a test tire 2 and its recurrent quartic curve.
Figure 4:
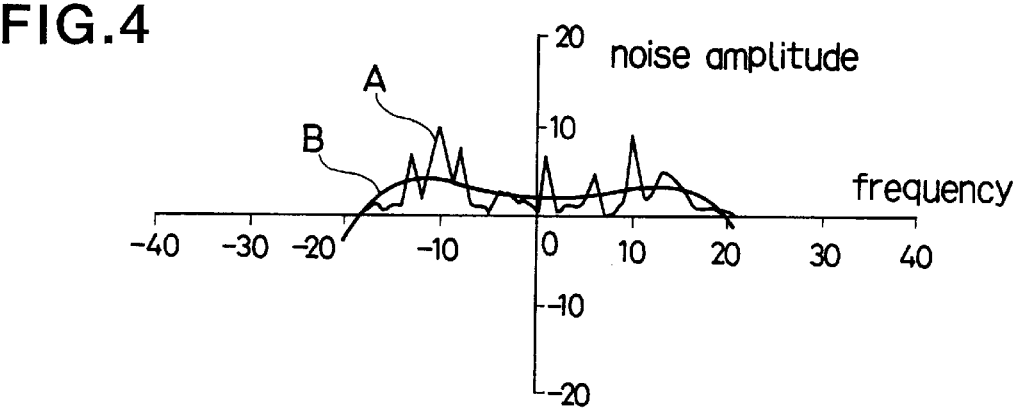
FIG. 4 is a graph showing a noise amplitude waveform in a test tire 3 and its recurrent quartic curve.
Figure 5:
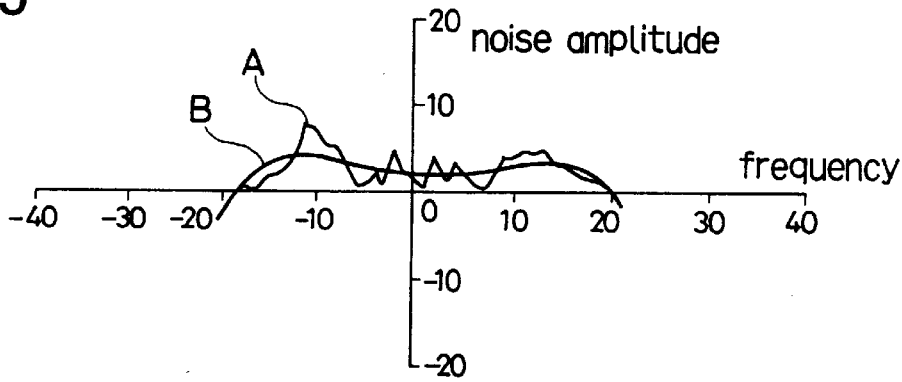
FIG. 5 is a graph showing a noise amplitude waveform in a test tire 4 and its recurrent quartic curve.
Figure 6:
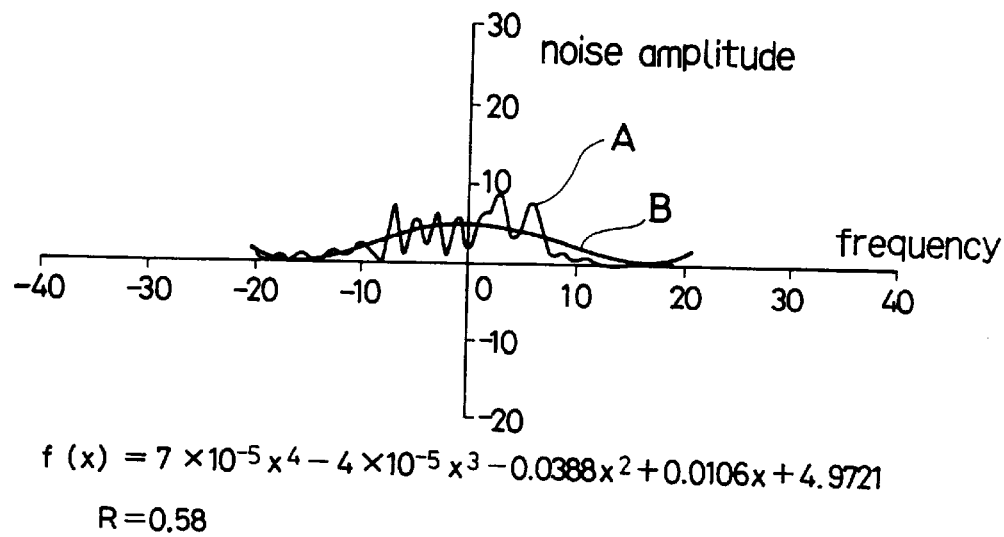
FIG. 6 is a graph showing a noise amplitude waveform in a test tire 5 and its recurrent quartic curve.
Figure 7:
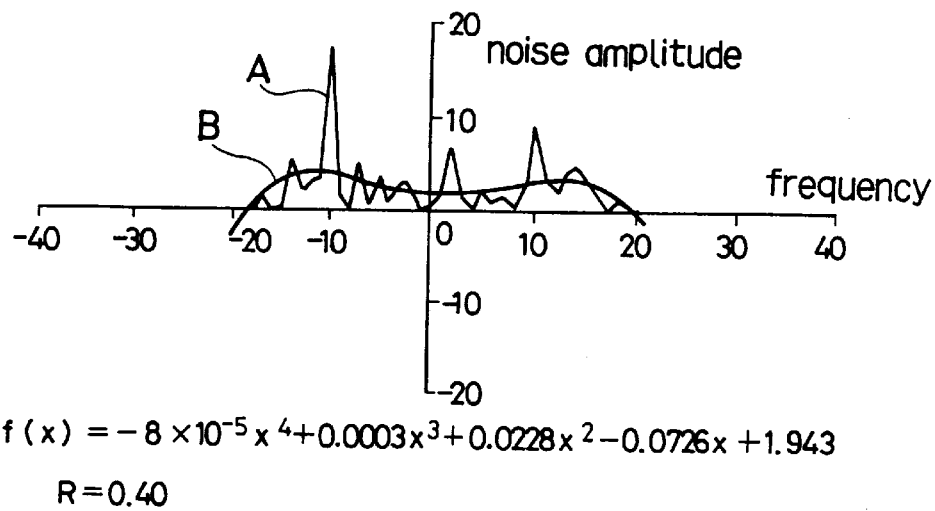
FIG. 7 is a graph showing a noise amplitude waveform in a reference tire and its recurrent quartic curve.

In FIG. 1, reference numeral 1 denotes a tread surface. Two main grooves 2 extending straight in a tire circumferential direction T are disposed on this tread surface 1 and are disposed symmetrically on the right and left sides of a tire equator CL. One each straight circumferential groove 3 extending in the tire circumferential direction T and having a smaller groove width than the main groove 2 is disposed on the tire equator CL and outside each main groove 2. The portions of the tire outside both circumferential grooves 3 positioned outside the main grooves 2 are shoulder portions.

Ribs 4 extending in the tire circumferential direction T are formed between both main grooves 2 and the circumferential groove 3 on the tire equator CL. One each slot-like kerf 5 extending straight in the tire circumferential direction T is formed at the center of each rib 4.

Transverse grooves (groove portions) 6 extending in the tire transverse direction from both kerfs 5 to the outside of the tire are disposed at a predetermined pitch in the tire circumferential direction T. Each transverse groove 6 comprises an inside groove portion 6a extending from the kerf 5 to the main groove 2 and an outside groove portion 6b extending from the main groove 2 to the outside of the tire beyond a tire ground contact end E.

Each of these inside and outside groove portions 6a and 6b extends obliquely with respect to the tire transverse direction with the inner end side thereof being positioned on the tire rotating direction side R. The inclined inside groove portion 6a is shaped into a straight shape and its inclination is greater than that of the outside groove portion 6b. The outside groove portion 6b is shaped in such a fashion that its side in the tire rotating direction R is recessed and curved.

A large number of blocks 7 defined by the outside groove portions 6a, both main grooves 2 and the circumferential grooves 3 on the tire outer side of the main grooves 2 are formed on the tread surface 1 at outer portions of the main grooves 2. One slot-like kerf 8 extending in the tire transverse direction along the transverse groove 6 is disposed at the center of each block 7 in the tire circumferential direction.

The pitch lengths P divided by the transverse grooves 6 are at least three kinds and are mutually different.

In the pneumatic tire having the construction described above, the pitch arrangement evaluation method according to the present invention first determines the amplitude waveform corresponding to the frequency of the noise resulting from the tread pattern of one circumference of the tire by a noise simulation method, and evaluates whether or not the pitch arrangement is a pitch arrangement of a low pattern noise by the value of a correlational coefficient R between the amplitude waveform and the quartic expression $f(x)=ax^4+bx^3+cx^2+dx+e$ obtained by the regression of the amplitude waveform. When the correlational coefficient R is 0.65 or more, the pitch arrangement is judged as the pitch arrangement having a low pattern noise, and when R is less than 0.65, the pitch arrangement is evaluated as the pitch arrangement not having the low pattern noise when the evaluation of the actual car test is conducted.

In the present invention, f(x) in the quartic expression described above represents the noise amplitude and x represents the frequency (number of degree) [Hz]. The correlational coefficient R is the value that can be obtained by the following equation by the method of least squares:

$$R = \sqrt{1 - \frac{S}{T}}$$

where $S = \sum (Y_i - \hat{Y}_i)^2$ $T = \left(\sum Y_i\right)^2 - \frac{\left(\sum Y_i\right)^2}{n}$ $\hat{Y}_i = ax_i^4 + bx_i^3 + \ldots$ $Y_i$ is an actual noise amplitude for frequency $x_i$, $n$ is the number of data.

As described above, the present invention evaluates whether or not the pitch arrangement is the one that coincides with the result of the evaluation of the actual car test, by utilizing the value of the correlational coefficient R between the noise amplitude waveform resulting from the pitch arrangement evaluated by the noise simulation method and its regression quartic expression. Accordingly, the present invention can reliably obtain a pneumatic tire having a pitch arrangement of a low pattern noise which always coincides with the actual car test result without carrying out the actual car test.

In the embodiment described above, the pneumatic tire used for the evaluation method of the present invention is preferably the tire having a total number of pitches of not greater than 200 per circumference. When the total number of pitches exceeds 200, the evaluation result does not always coincide with the actual car test evaluation result even when the correlational coefficient is greater than 0.65. The lower limit value of the total number of pitches is not particularly limited, and may be the number of pitches of tires that are practically used, e.g. about 40.

The ratio Pa/Pe of the maximum pitch length Pa to the minimum pitch length Pe among all the pitches is preferably at least 1.4. The upper limit value of this ratio Pa/Pe is not particularly limited, and so long as the tires have a practical ratio Pa/Pe such as about 1.7, they can be used as an object of a low-pattern-noise tire in the evaluation method of the present invention.

According to the present invention, the pneumatic tires evaluated by the pitch arrangement evaluation method and having the following construction can be said as pneumatic tires having a good low pattern noise.

In other words, the tires have a total number of pitches of 40 to 200, have at least three kinds of pitches having mutually different lengths and have the ratio Pa/Pe of the maximum pitch length Pa to the minimum pitch length Pe among all the pitches of $1.4 \leq Pa/Pe \leq 1.7$.

If the total number of pitches is smaller than 40, it becomes difficult to accomplish a low pattern noise in the pneumatic tires having three or more kinds of pitch lengths. If the total number of pitches is greater than 200, the evaluation result by the noise simulation method does not always coincide with the evaluation result by the actual car test as described above.

So long as the number of kinds of the pitches is at least three, the upper limit value is not particularly limited but from the aspect of the production cost of a mold, etc, the number of kinds is preferably not greater than seven.

If the ratio Pa/Pe is less than 1.4, it becomes difficult to obtain a low pattern noise and if it exceeds 1.7, on the contrary, non-uniform wear of the blocks becomes likely to occur.

The pitch arrangement may be either a periodical arrangement or a random arrangement. When the total number of pitches is within 60 to 160, it is preferred to use three periodical arrangements for the pitch arrangement so as to further reduce the pattern noise.

Incidentally, in the pneumatic tire shown in FIG. 1, each pitch on the tread surface 1 in the tire circumferential direction T is determined by the transverse groove 6 for dividing and defining the blocks. However, kerfs or lug grooves extending in the tire transverse direction or corners of zigzag main grooves defining the rib pattern may be used to determine each pitch in place of these transverse grooves. In other words, the grooves are not particularly limited to the transverse grooves so long as they can determine the pitch as the repeating unit in the tread pattern.

EXAMPLE 1

Test tires 1 to 5 each having the tread pattern shown in FIG. 1 and having the total number of pitches, the kinds of the pitch lengths (kinds of pitches) and the ratio Pa/Pe of the maximum pitch length Pa to the minimum pitch length Pe and the pitch arrangement method tabulated in Table 1, and a conventional reference tire as the reference of the pattern noise, were produced, respectively.

The tire size of each test tire (inclusive of the reference tire) was 205/65R15 94H and was in common.

The correlational coefficient R between the noise amplitude waveform and the quartic expression obtained by its regression was obtained by the noise simulation method for each of these test tires. Each of these test tires was fitted to a rims having a rim size of 61/2JJ×15, and after the pneumatic pressure was set to 200 KPa, the tires were fitted to a 3000 cc passenger car. The evaluation test of noise performance was then carried out under the measurement condition listed below, and the test result was obtained as tabulated in Table 1.

Incidentally, FIGS. 2 to 7 show the noise amplitude waveform (A) corresponding to the frequency of the noise by the noise simulation method in the test tires 1 to 5 and the reference tire, and their regression quartic curves (B).

Noise Performance
1. Feeling Test

The pattern noise was evaluated by a feeling test by test drivers in a test course. The result was represented by an index value using the result of the reference tire as 100. The greater this value, the higher becomes noise performance.

2. Measurement Test

The test car was driven at a speed of 60 km/h in the test course and the sound pressure level was measured by a microphone positioned at the center inside the car. The result was evaluated by an index value using the result of the reference tire as 100. The greater this value, the higher becomes noise performance.

TABLE 1

|  | test tire 1 | test tire 2 | test tire 3 | test tire 4 | test tire 5 | reference tire |
|---|---|---|---|---|---|---|
| total number of pitches | 30 | 70 | 80 | 80 | 120 | 70 |
| kind of pitches | 3 | 5 | 3 | 5 | 3 | 3 |
| Pa/Pe | 1.60 | 1.56 | 1.53 | 1.60 | 1.34 | 1.50 |
| arrangement method | 3 cycle | 3 cycle | random | 3 cycle | random | 3 cycle |
| correlational coefficient | 0.36 | 0.92 | 0.66 | 0.84 | 0.58 | 0.40 |

TABLE 1-continued

|  | test tire 1 | test tire 2 | test tire 3 | test tire 4 | test tire 5 | reference tire |
|---|---|---|---|---|---|---|
| noise feeling test | 95 | 112 | 103 | 108 | 95 | 100 |
| noise measurement test | 96 | 110 | 103 | 107 | 97 | 100 |

It can be understood clearly from Table 1 that the test tires 2, 3 and 4 having the correlational coefficient R of at least 0.65 exhibited a low pattern noise which was coincident with the feeling evaluation of the actual car test and the measurement evaluation. In the test tire 5 having a correlational coefficient R of 0.58, however, both the feeling evaluation of the actual car test and the measurement evaluation did not have a low pattern noise. Therefore, it can be understood that the pitch arrangement of the low pattern noise can be evaluated from the value of the correlational coefficient R.

EXAMPLE 2

In the tread pattern shown in FIG. 1, a test tire 6 having a total number of pitches of 210 and having the same tire size as described above was produced. In this test tire 6, the number of kinds of pitches was five, Pa/Pe was 1.60 and the pitch arrangement method was three-cycle arrangement.

Figure 8:
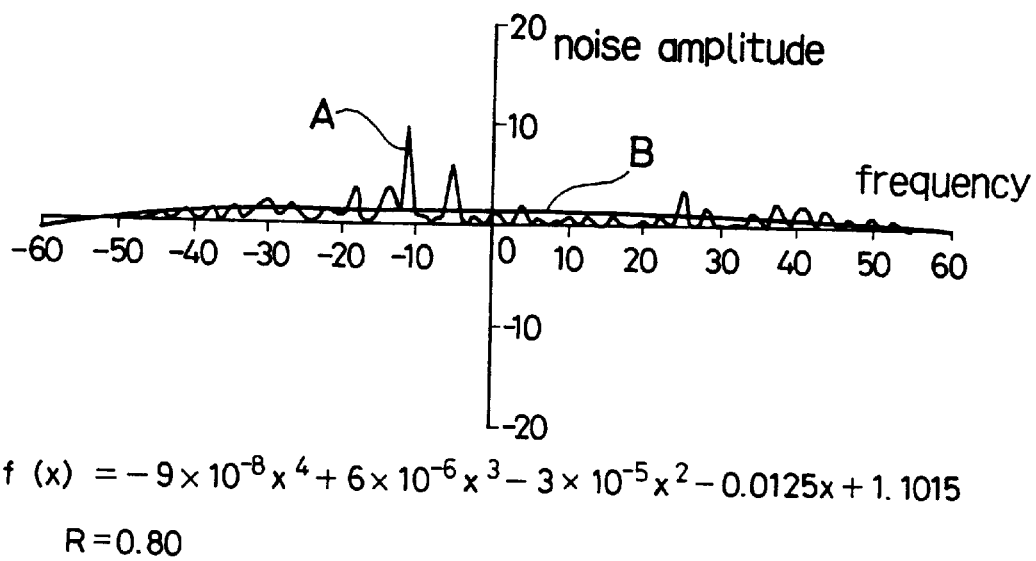
FIG. 8 is a graph showing a noise amplitude waveform in a test tire 6 and its recurrent quartic curve.

The correlational coefficient R of this test tire 6 was similarly determined, and the evaluation test of noise performance by the actual car driving test was carried out. As a result, the correlational coefficient R was 0.80, the noise feeling test was 97 and the noise measurement test was 98. Incidentally, FIG. 8 is a graph showing the noise amplitude waveform (A) in noise simulation of the test tire 6 and its regression quartic curve (B).

It can be understood from the result that when the total number of pitches was 210, the evaluation result by the actual car test was inferior even though the correlational coefficient R was greater than 0.65, and the evaluation result by the evaluation method of the present invention did not coincide with the result of the actual car test.

Industrial Applicability

The present invention having the excellent effects described above can be utilized extremely effectively for evaluating the pattern noise of the pneumatic tires fitted to cars, particularly for evaluating the pattern noise resulting from the pitch arrangement of the tread pattern of the pneumatic tire for passenger cars, by simulation from the pitch arrangement.

What is claimed is:

1. An evaluation method of a pitch arrangement of a tread pattern of a pneumatic tire having a tread pattern such that the pitches determined by a large number of grooves disposed on the tread surface at a predetermined pitch in at least a tire circumferential direction have at least three different kinds of pitch lengths, characterized in that an amplitude waveform corresponding to the frequency of noise resulting from the pitch arrangement of one circumference of said tire is determined by a noise simulation method, a correlational coefficient R expressed by the formula below between the amplitude waveform and a quartic expression $f(x)=ax^4+bx^3+cx^2+dx+e$ (where $f(x)$ is a noise amplitude and x is the frequency) obtained by regression of the amplitude waveform is determined, and whether or not the pitch arrangement obtained by said noise simulation method is a pitch arrangement of a low pattern noise is evaluated from the value of said correlational coefficient R:

$$R = \sqrt{1 - \frac{S}{T}}$$

where $S = \sum (Y_i - \hat{Y}_i)^2$, $T = \left(\sum Y_i\right)^2 - \frac{\left(\sum Y_i\right)^2}{n}$ $\hat{Y}_i = a t_i^4 + b x_i^3 + \ldots$ $Y_i$ is an actual noise amplitude for frequency $x_i$, and $n$ is the number of data.

2. An evaluation method of a pitch arrangement of a tread pattern of a pneumatic tire according to claim 1, wherein a pitch arrangement having said correlational coefficient value R, obtained by said noise simulation method, of at least 0.65 is evaluated as a pitch arrangement of a low pattern noise.

3. An evaluation method of a pitch arrangement of a tread pattern of a pneumatic tire according to claim 2, wherein the total number of pitches of the pitch arrangement of said tire is not greater than 200.

4. An evaluation method of a pitch arrangement of a tread pattern of a pneumatic tire according to claim 2, wherein a ratio Pa/Pe of a maximum pitch length Pa in the pitch arrangement of said tire to a minimum pitch length Pe is at least 1.4.

5. An evaluation method of a pitch arrangement of a tread pattern of a pneumatic tire according to claim 1, wherein said pitch arrangement is a periodical arrangement.

6. An evaluation method of a pitch arrangement of a tread pattern of a pneumatic tire according to claim 1, wherein said pitch arrangement is a random arrangement.

* * * * *

UNITED STATES PATENT AND TRADEMARK OFFICE
CERTIFICATE OF CORRECTION

PATENT NO. : 5,974,872

DATED : November 2, 1999

INVENTOR(S) : Morishita et al.

It is certified that error appears in the above-identified patent and that said Letters Patent is hereby corrected as shown below:

```
      On the title page,
      Item [54] please delete " PITCH ARRANGEMENT EVALUATION
SYSTEM OF TREAD PATTERN OF PNEUMATIC TIRE " and insert therefor,
-- EVALUATION METHOD OF TREAD PATTERN PITCH ARRANGEMENT OF
PNEUMATIC TIRE --
```

Signed and Sealed this

Thirty-first Day of October, 2000

Attest:

Q. TODD DICKINSON

Attesting Officer   Director of Patents and Trademarks